United States Patent
Choukir et al.

(10) Patent No.: US 12,483,861 B2
(45) Date of Patent: Nov. 25, 2025

(54) LIGHTWEIGHT PATH MAXIMUM TRANSMISSION UNIT FOR WIRELESS MULTICAST OVERLAY

(71) Applicant: Cisco Technology, Inc., San Jose, CA (US)

(72) Inventors: Amine Choukir, Lusanne (CH); Domenico Ficara, Essertines-sur-Yverdon (CH); Pascal Thubert, Roquefort-les-Pins (FR); Jerome Henry, Pittsboro, NC (US); Ashish Kumar, San Jose, CA (US); Yi Xu, Dublin, CA (US); Araz Yagubov, Ecublens (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 616 days.

(21) Appl. No.: 17/527,572

(22) Filed: Nov. 16, 2021

(65) Prior Publication Data
US 2023/0065679 A1   Mar. 2, 2023

Related U.S. Application Data (60) Provisional application No. 63/236,983, filed on Aug. 25, 2021.

(51) Int. Cl.
*H04W 4/06* (2009.01)
*H04L 45/741* (2022.01)

(52) U.S. Cl.
CPC ............. *H04W 4/06* (2013.01); *H04L 45/741* (2013.01)

(58) Field of Classification Search
CPC .............................. H04L 45/741; H04W 4/06
See application file for complete search history.

(56) References Cited

U.S. PATENT DOCUMENTS

| | | | |
|---|---|---|---|
| 8,402,153 B2 * | 3/2013 | Friedman | H04L 47/36 709/228 |
| 10,237,157 B1 * | 3/2019 | Sears | H04L 43/0817 |

(Continued)

FOREIGN PATENT DOCUMENTS

| CN | 102395144 A | * | 3/2012 |
|---|---|---|---|
| CN | 102547583 A | * | 7/2012 |

(Continued)

OTHER PUBLICATIONS

Ren, "Wireless Access Point Updated Method, System and Device," English Machine Translation of Ren (CN 102395144 A), Clarivate Analytics, pp. 1-21 (Year: 2024).*

(Continued)

*Primary Examiner* — Marcus Smith
*Assistant Examiner* — Kai Chang
(74) *Attorney, Agent, or Firm* — Edell, Shapiro & Finnan, LLC (57) ABSTRACT

Presented herein are techniques to address a lack of path maximum transmission unit discovery in the context of, e.g., the control and provisioning of wireless access point (CAPWAP) protocol for multicast communications. In one embodiment, IPv4-IPv6-IPv4 network address translation is used to avoid a conservative maximum transmission unit size. In another embodiment, unicast and multicast path maximum transmission unit discovery techniques are executed to set the maximum transmission unit size for multicast communications.

20 Claims, 8 Drawing Sheets

(56) References Cited

U.S. PATENT DOCUMENTS

| | | | |
|---|---|---|---|
| 11,323,414 B2* | 5/2022 | Vavrusa | H04L 67/568 |
| 11,570,283 B1* | 1/2023 | Ghule | H04L 63/1483 |
| 2006/0140213 A1* | 6/2006 | Hwang | H04L 69/08 |
| | | | 370/466 |
| 2006/0221844 A1* | 10/2006 | Subramanian | H04L 45/16 |
| | | | 370/248 |
| 2007/0147421 A1* | 6/2007 | Kim | H04L 61/2535 |
| | | | 370/395.54 |
| 2011/0090815 A1* | 4/2011 | Gundavelli | H04L 61/2517 |
| | | | 370/253 |
| 2012/0005372 A1* | 1/2012 | Sarikaya | H04W 80/045 |
| | | | 709/245 |
| 2013/0028163 A1* | 1/2013 | Hsiao | H04W 4/06 |
| | | | 370/312 |
| 2013/0094505 A1* | 4/2013 | Sarikaya | H04L 45/741 |
| | | | 370/390 |
| 2014/0105060 A1* | 4/2014 | Baillargeon | H04W 8/24 |
| | | | 370/253 |
| 2015/0131447 A1 | 5/2015 | Petry et al. | |
| 2016/0248749 A1 | 8/2016 | Mahapatra | |
| 2017/0019344 A1 | 1/2017 | Przygienda et al. | |
| 2019/0312820 A1 | 10/2019 | Yu et al. | |
| 2023/0074712 A1* | 3/2023 | He | H04W 28/0263 |

FOREIGN PATENT DOCUMENTS

| | | | |
|---|---|---|---|
| CN | 102780633 A | | 11/2012 |
| CN | 103095585 A | * | 5/2013 |

OTHER PUBLICATIONS

Jin, "A Multicast Control Flow Information Intercommunication Method and System Between IPv4 and IPv6," English Machine Translation of Jin (CN 103095585 A), Clarivate Analytics, pp. 1-16 (Year: 2024).*
Wen, "Multicast Service Transmission Control Method in Wireless Local Area Network System, Device and System Thereof," English Machine Translation of Wen (CN 102547583 A), Clarivate Analytics, pp. 1-10 (Year: 2024).*
B. Haberman, "Allocation Guidelines for IPv6 Multicast Addresses", Network Working Group, The Internet Society, Aug. 2002, 8 pages.
B. Haberman et al., "Unicast-Prefix-based IPv6 Multicast Addresses", Network Working Group, The Internet Society, Aug. 2002, 7 pages.
P. Calhoun, Ed et al., "Control And Provisioning of Wireless Access Points (CAPWAP) Protocol Specification", Network Working Group, IETF, Mar. 2009, 155 pages.
R. Hinden et al., "IP Version 6 Addressing Architecture", Network Working Group, The Internet Society, Feb. 2006, 25 pages.
S. Deering, "Host Extensions for IP Multicasting", Network Working Group, Aug. 1989, 17 pages.
Google Sites, "464XLAT—A Solution for Providing IPv4 Services Over and IPv6-only Network", retrieved from Internet Aug. 20, 2021, 20 pages; https://sites.google.com/site/tmoipv6/464xlat.
Tathagata Nandy et al., "Multicast Path MTU", draft-nandy-utkarsh-pim-mcast-path-mtu-00, IETF, Jan. 18, 2021, 8 pages.
Information Sciences Institute University of Southern California, "DARPA Internet Program Protocol Specification", Sep. 1981, 51 pages.

* cited by examiner

FIG.8 ns to address the lack of PMTU discovery in the context of CAPWAP, according to an example embodiment.

LIGHTWEIGHT PATH MAXIMUM TRANSMISSION UNIT FOR WIRELESS MULTICAST OVERLAY

CROSS REFERENCE TO RELATED APPLICATION

This application claims the benefit of U.S. Provisional Application No. 63/236,983, filed Aug. 25, 2021, which is incorporated herein by reference in its entirety.

TECHNICAL FIELD

The present disclosure relates to multicast communication in a wireless local area network.

BACKGROUND

Multicast allows efficient handling of a packet from one sender to multiple recipients. Without multicast, one needs to resort to unicast replication of packets which leads to substantial load on the sender and unnecessary bandwidth utilization on a common path between the sender and receiver. This is can be particularly troublesome in an enterprise and service provider wireless deployment with a non-trivial number of deployed Access Points (APs) and clients.

Control and Provisioning of Wireless Access Point (CAPWAP) (RFC 5415) is a protocol that enables a WLC to manage a collection of wireless APs. Some wireless local area network (WLAN) controllers (WLCs), which control the APs, support the use of a multicast group for replication of packets to APs using CAPWAP. In one use case, CAPWAP is configured to distribute the packet load on the wired infrastructure.

Unfortunately, since in multicast, there is no current way to discover a Path Maximum Transmission Unit (MTU) (PMTU), using multicast for packet distribution to APs forces the manual configuration of a Maximum Transmission Unit (MTU) (which may be cumbersome), forces the use of the MTU of the exit interface (an assumption could be made that that MTU is consistent along the path), or, to be very conservative, forces the use of the small 576 bytes MTU guaranteed by RFC 791. A smaller MTU puts a burden on the APs, which may then need to reassemble up to three times more packets than they might otherwise have to if a larger MTU were used. Depending on the multicast stream, this burden could overwhelm a given AP.

DESCRIPTION OF EXAMPLE EMBODIMENTS

Overview

Presented herein are techniques to address PMTU discovery limitations in the context of, e.g., CAPWAP for multicast communications. In one embodiment, a method includes detecting that an IPv4 multicast packet is to be transmitted from a wireless local area network controller to a plurality of wireless access points; embedding the IPv4 multicast packet in an IPv6 multicast packet; transmitting the IPv6 multicast packet to the wireless access points; extracting the IPv4 multicast packet from the IPv6 multicast packet; and transmitting the IPv4 multicast packet from the plurality of wireless access points.

In another embodiment, a device is provided. The device includes an interface configured to enable network communications; a memory; and one or more processors coupled to the interface and the memory, and configured to: detect that an IPv4 multicast packet is to be transmitted from a wireless local area network controller to a plurality of wireless access points; embed the IPv4 multicast packet in an IPv6 multicast packet; transmit the IPv6 multicast packet to the wireless access points; extract the IPv4 multicast packet from the IPv6 multicast packet; and transmit the IPv4 multicast packet from the plurality of wireless access points.

In still another embodiment, a method includes sending, by a wireless local area network controller, respective messages to wireless access points that are in communication with the wireless local area network controller and that are members of a same multicast group; receiving respective responses from at least a subset of the wireless access points; based on the respective responses, determining a path maximum transmission unit to use to send multicast packets to each of the wireless access points; and sending, by the wireless local area network controller, multicast packets to the wireless access points, wherein a size of the multicast packets is in accordance with the path maximum transmission unit.

In yet another embodiment, a device includes an interface configured to enable network communications; a memory; and one or more processors coupled to the interface and the memory, and configured to: send, by a wireless local area network controller, respective messages to wireless access points that are in communication with the wireless local area network controller and that are members of a same multicast group; receive respective responses from at least a subset of the wireless access points; based on the respective responses, determine a path maximum transmission unit to use to send multicast packets to each of the wireless access points; and send, by the wireless local area network controller, multicast packets to the wireless access points, wherein a size of the multicast packets is in accordance with the path maximum transmission unit.

EXAMPLE EMBODIMENTS

As explained in the background section above, a smaller MTU in the context of communication between a WLC and APs can lead to overburdening the APs in the WLAN. One might consider simply using a higher MTU size and allow the native Internet Protocol (IP) layer fragmentation function to perform its fragmentation and reassembly work. However, CAPWAP mandates the use of the "Don't Fragment" bit or flag in the datagram header in an effort to avoid IP fragmentation. IP fragmentation, in some implementations, can cause issues in middle boxes (i.e., intervening nodes), potentially resulting in lost packets and reduced throughput efficiency.

A conservative MTU size is thus often selected in the multicast context due to the lack of Path MTU (PMTU) discovery, as currently exists in the context of CAPWAP unicast transport. The lack of PMTU discovery in the multicast context is as per design in RFC 1112. As such, an Internet Control Message Protocol (ICMP) error message (e.g., Destination Unreachable, Time Exceeded, Parameter Problem, Source Quench, or Redirect) is never generated in response to a datagram destined to an IP host group. As a result, if a selected MTU is too large, and a given packet does not arrive at its intended destination, the source of the multicast packet might never know of the failure.

More specifically, in a wireless overlay, CAPWAP unicast control and data tunnels are established between a wireless controller and its managed APs. The CAPWAP data tunnel is mainly used for the transport of client data traffic. As noted, CAPWAP (RFC 5415) mandates the use of the "Don't Fragment" bit to avoid issues seen with fragmentation due to a firewall, Network Address Translation (NAT) and middle-boxes. As such, the CAPWAP data unicast tunnel runs a Path MTU Discovery (PMTUD) procedure to determine the usable MTU, after CAPWAP overhead, to send client data and perform the appropriate fragmentation/reassembly on that basis.

When multicast traffic is involved in managed wireless infrastructure, a replication needs to happen either at the wireless controller or at the wired infrastructure in between the wireless controller and the APs. Wireless controller replication overburdens the controller appliance at scale and has been discouraged in favor of wired multicast replication. Unfortunately, as noted, wired multicast has no PMTUD procedure, thus forcing the entire wireless overlay to make very conservative assumptions such as using the lesser of 576 bytes or the exit interface MTU, manual configuration.

In view of the lack of PMTU discovery in multicast, presented herein are techniques to address limited MTU size in the context of CAPWAP. These techniques may leverage the controlled overlay of which the wireless controller and APs are a part, to assess the best MTU to use for wired multicast replication.

Notably, the techniques described herein are applicable to any overlay where a unicast feedback channel exists between the sender and the receiver (e.g., the Real-time Transport Protocol (RTP) Control Protocol (RTCP)).

Presented herein are embodiments for
(1) NAT IPv4/IPv6 network address translation on multicast addresses;
(2) Using the intersection of unicast PMTU of APs participating in the multicast group as the multicast MTU;
(3) Using special path MTU packets destined to the multicast group without the IP Don't Fragment (DF) bit set; and
(4) Using special path MTU packets destined to the multicast group with the DF bit set.

Reference is now made to the several figures.

Multicast NAT "464"

Figure 1:
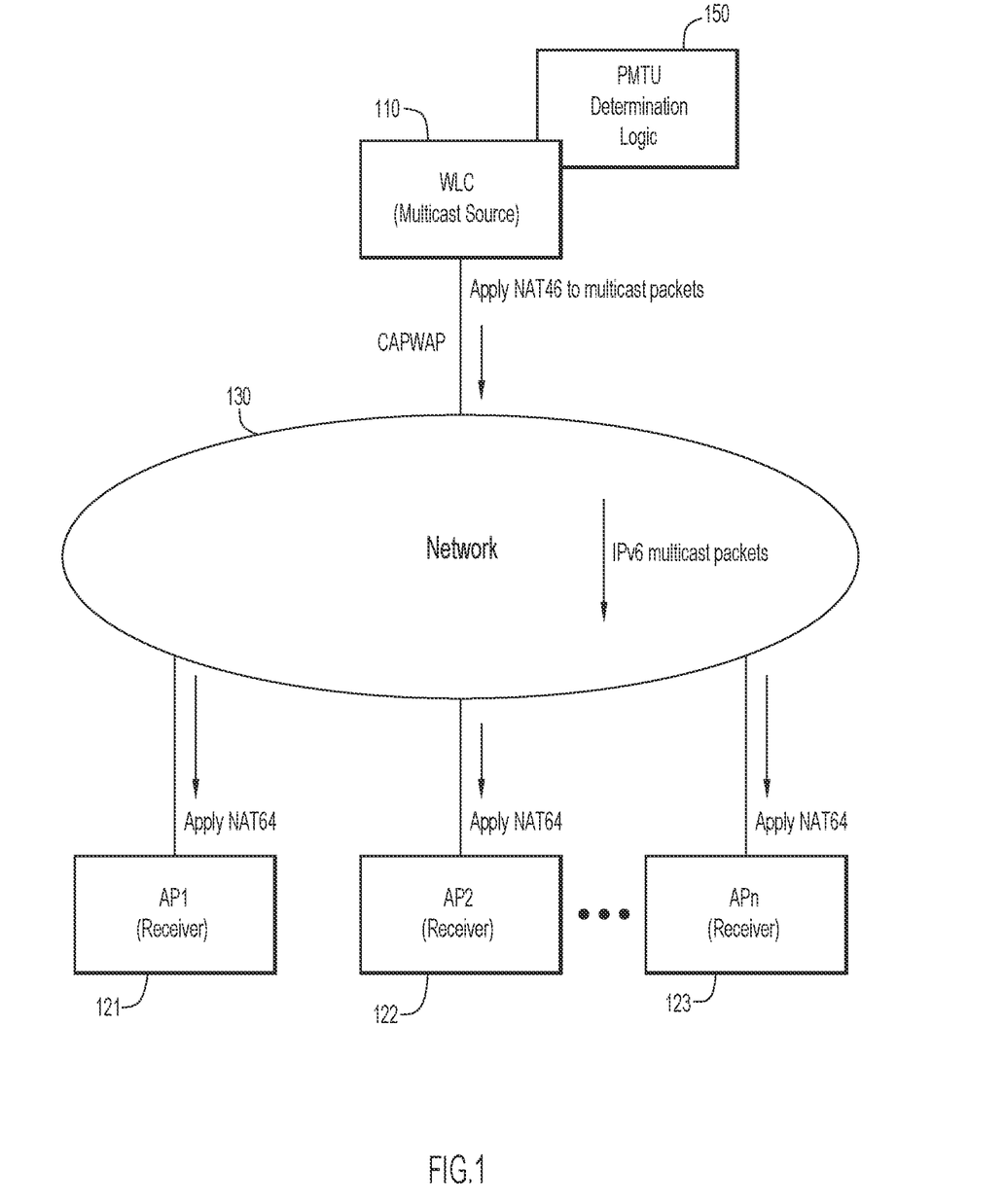
FIG. 1 is a block diagram of a network topology including path MTU (PMTU) determination logic and showing, in one embodiment, the use of network address translation (NAT) techniques to address the lack of PMTU discovery in the context of CAPWAP, according to an example embodiment.

FIG. 1 is a block diagram of a network topology including path PMTU (PMTU) determination logic 150 and showing, in one embodiment, the use of network address translation (NAT) techniques to address the lack of PMTU discovery in the context of CAPWAP, according to an example embodiment. As shown, a WLC 110 is in communication with a plurality of APs, AP1 121, AP2 122, APn 123 via a network 130, which could be wired or wireless. PMTU determination logic 150 may be deployed on WLC 110 or may be accessible by WLC 110 via a network connection. As indicated in FIG. 1, WLC 110 functions as a multicast source, and AP1 121, AP2 122, APn 123 each functions as a receiver of the multicast traffic.

The NAT IPv4/IPv6 network address translation of this embodiment applies to any dual stack network IPv4/IPv6 network. As shown in FIG. 1, this embodiment applies a NAT46 translation to multicast packets at the source, i.e., the (WLC) 110, and a NAT64 translation at the multiple destinations (or first hop router/switch) so that the IPv4 multicast packets traverse the network in the IPv6 form. This guarantees the IPv6 minimum MTU of 1280 bytes on all links, rather than the much more limited 576 bytes.

In other words, in this embodiment, an IPv4 multicast packet is turned into an IPv6 multicast packet. This transformation may be performed, or at least controlled by, PMTU determination logic 150. The packet is then multicast in IPv6 form so it can be as long as 2072 octet with the guarantee that it will not be fragmented.

Section 2.7 of RFC 4291 defines the format for an IPv6 multicast address as follows:

| 8 | 4 | 4 | 112 |
|---|---|---|---|
| 0xFF | flg | scp | Group ID | where scp is the scope, and scp=2 means link local.

Section 4 of RFC 3306 specifies a format for multicast addresses that derive from a local prefix, which can be as long as 64 bits (plen=64).

| 8 | 4 | 4 | 8 | 8 | 64 | 32 |
|---|---|---|---|---|---|---|
| 0xFF | flg | scp | rsv | plen | network prefix | Group ID |

The Group ID is permanent or dynamic, as described in Section 4.2 of RFC 3307.

The flg field (flags) is typically set to 3, meaning P and T below are set, and the two leftmost flags are reserved as shown below:

| 0 | 0 | P | T |
|---|---|---|---|

The P flag is set to 1 to indicate that a multicast address is assigned based on the network prefix. The T flag set to 1 to indicate that the address is dynamic.

In accordance with an embodiment, a new Flag "E" is defined in the flag field to indicate that the Group ID is, in fact, an embedded IPv4 address:

| 0 | E | P | T |
|---|---|---|---|

These techniques derive from RFC 3306 a format for embedding an IPv4 address, using a Group ID that is, in fact, an IPv4 multicast group as shown below for a link-scope multicast:

| 8 | 4 | 4 | 8 | 8 | 64 | 32 |
|---|---|---|---|---|----|----|
| 0xFF | 7 | 2 | 0 | plen = 64 | network prefix | Group ID |

With this arrangement, an IPv4 multicast packet is NATed to an IPv6 packet with the destination address formed in the IPv6 Group ID field, as shown above. The IPv6 source address embedding the IPv4 address is described in Section 2.5.5 of RFC 4291. The packet traverses the multicast dual stack network.

The described network address translation guarantees an MTU of 1272 bytes for the multicast IPv4 packets (1280−40+32) considering that the IPv6 header is 40 bytes and the IPv4 header is 32 bytes.

Figure 2:
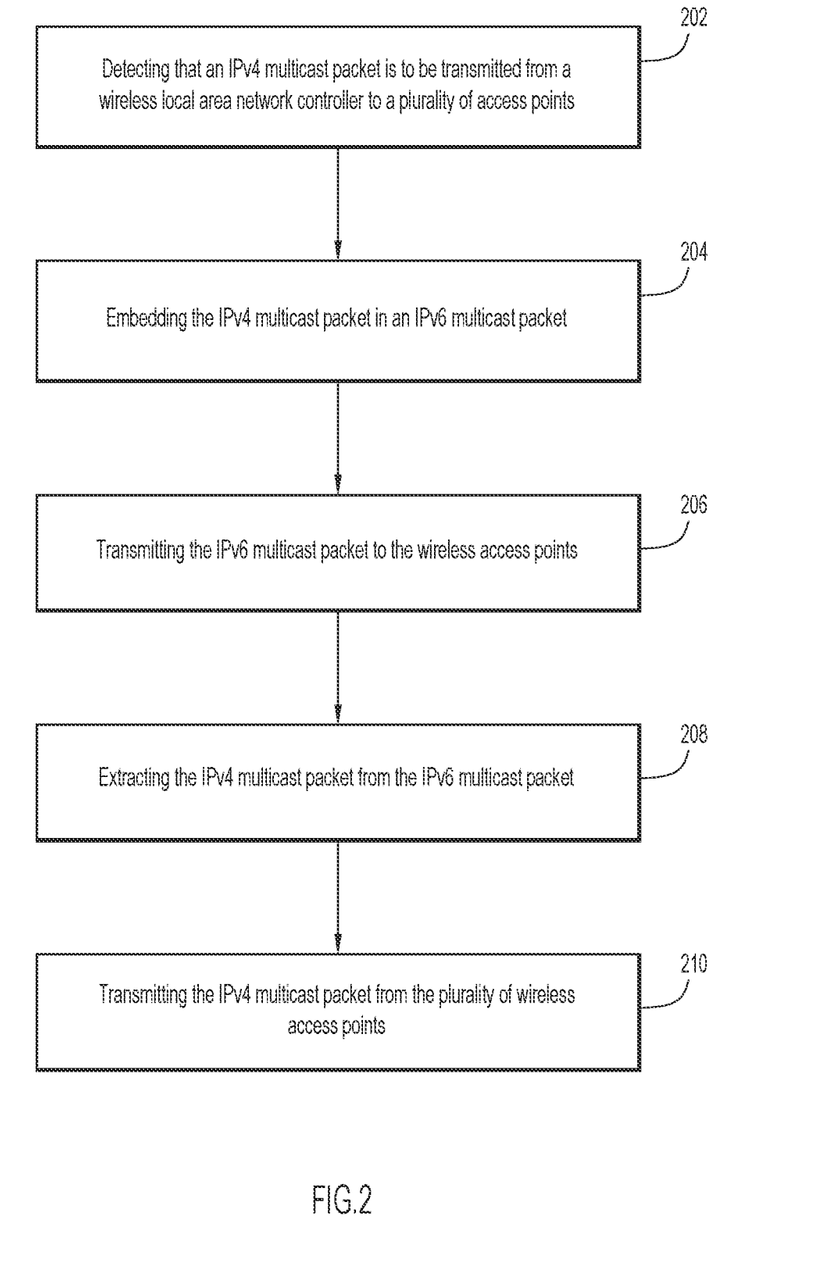
FIG. 2 is a flow chart depicting a series of operations for performing NAT464 to achieve a larger MTU for a multicast packet that is transmitted in a WLAN that is configured in the context of CAPWAP, according to an example embodiment.

FIG. 2 is a flow chart depicting a series of operations for performing NAT464 to achieve a larger MTU for a multicast packet that transmitted in a WLAN that is configured in the context of a CAPWAP, according to an example embodiment. At 202, an operation detects that an IPv4 multicast packet is to be transmitted from a wireless local area network controller to a plurality of wireless access points. At 204, an operation embeds the IPv4 multicast packet in an IPv6 multicast packet. At 206, an operation transmits the IPv6 multicast packet to the wireless access points. At 208, an operation extracts the IPv4 multicast packet from the IPv6 multicast packet. And, at 210, an operation transmits the IPv4 multicast packet from the plurality of wireless access points.

Unicast PMTU Intersection

Figure 3:
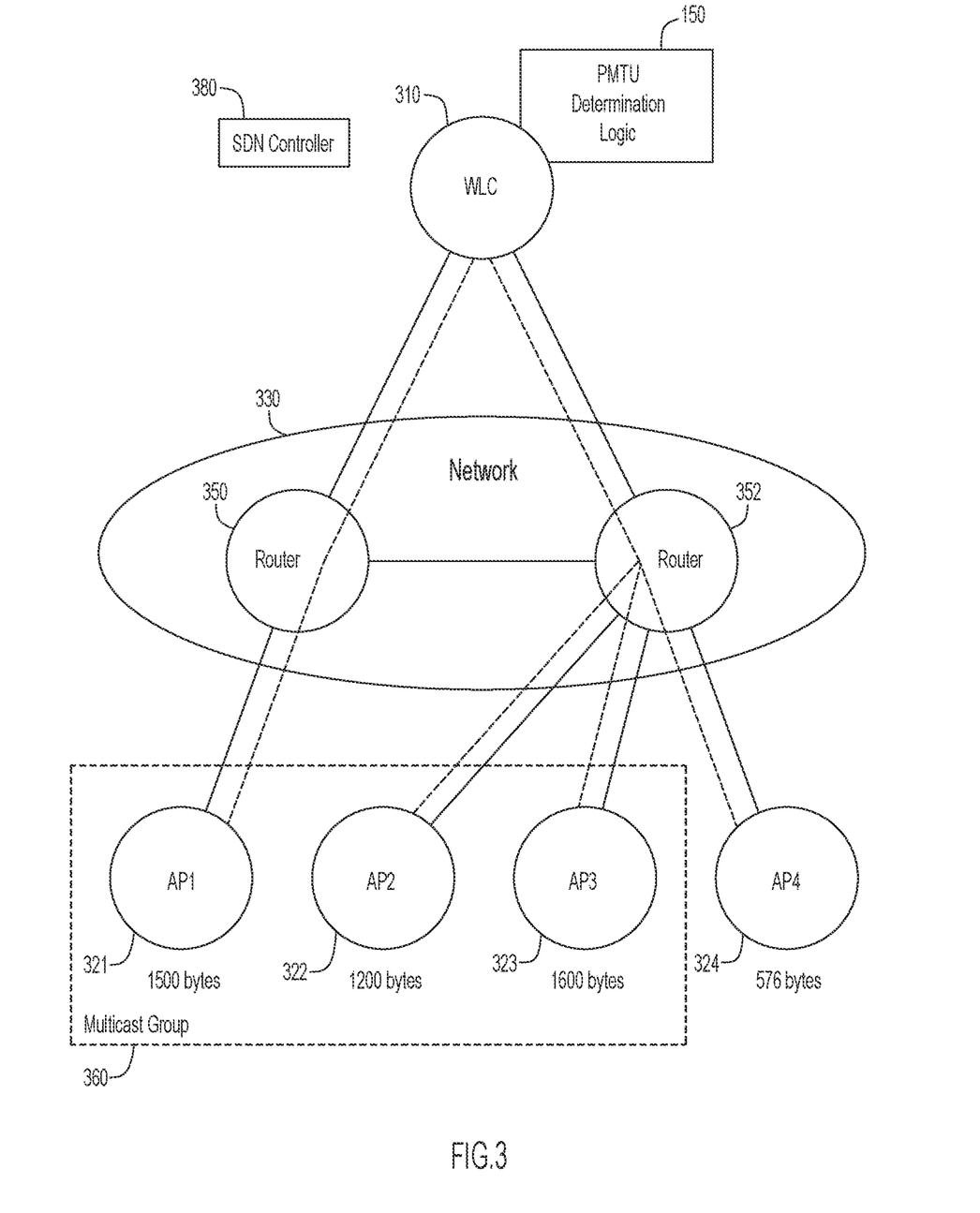
FIG. 3 is a block diagram of a network topology depicting an approach for selecting a PMTU size in a multicast context, according to an example embodiment.

Reference is now made to FIG. 3, which a block diagram of a network topology depicting an approach for selecting a PMTU size in a multicast context, according to an example embodiment. FIG. 3 shows a WLC 310 in communication with a plurality of APs, e.g., AP1 321, AP2 322, AP3 323, AP4 324, via a network 330, which could be wired or wireless, and includes router 350 and router 352. PMTU determination logic 150 may be deployed on WLC 310 or may be accessible by WLC 310 via a network connection. WLC 310 functions as a multicast source, and AP1 321, AP2 322, AP3 323 each functions as a receiver of the multicast traffic, i.e., they are in a multicast group 360.

In this embodiment, CAPWAP unicast tunnels (broken lines) are running side by side with the CAPWAP multicast tunnel. In this approach, PMTU determination logic 150 leverages the path MTU computed for the unicast tunnel as an indication of the MTU to use for the multicast tunnel. PMTU determination logic 150 is configured to take the intersection of the unicast PMTU of the APs participating to the multicast group 360 (i.e., AP1, 321, AP2, 322, AP3 323). Consider the following example:

Unicast PMTU: AP1=1500 bytes, AP2=1200 bytes, AP3=1600 bytes, AP4=576 bytes

Multicast group: AP1, AP2, AP3

With this information, PMTU determination logic 150 is configured to determine that a MTU of 1200 bytes for the multicast tunnel is driven by the unicast PMTU of AP2, i.e., the lowest among the multicast group 360. As such, PMTU determination logic 150 may make this MTU selection for sending multicast traffic via the multicast tree.

This approach is well suited to multicast networks running Protocol Independent Multicast Source Specific Multicast (PIM-SSM), where a spanning tree from the source is computed for the different destinations based on regular routing information that is shared with unicast.

Figure 4:
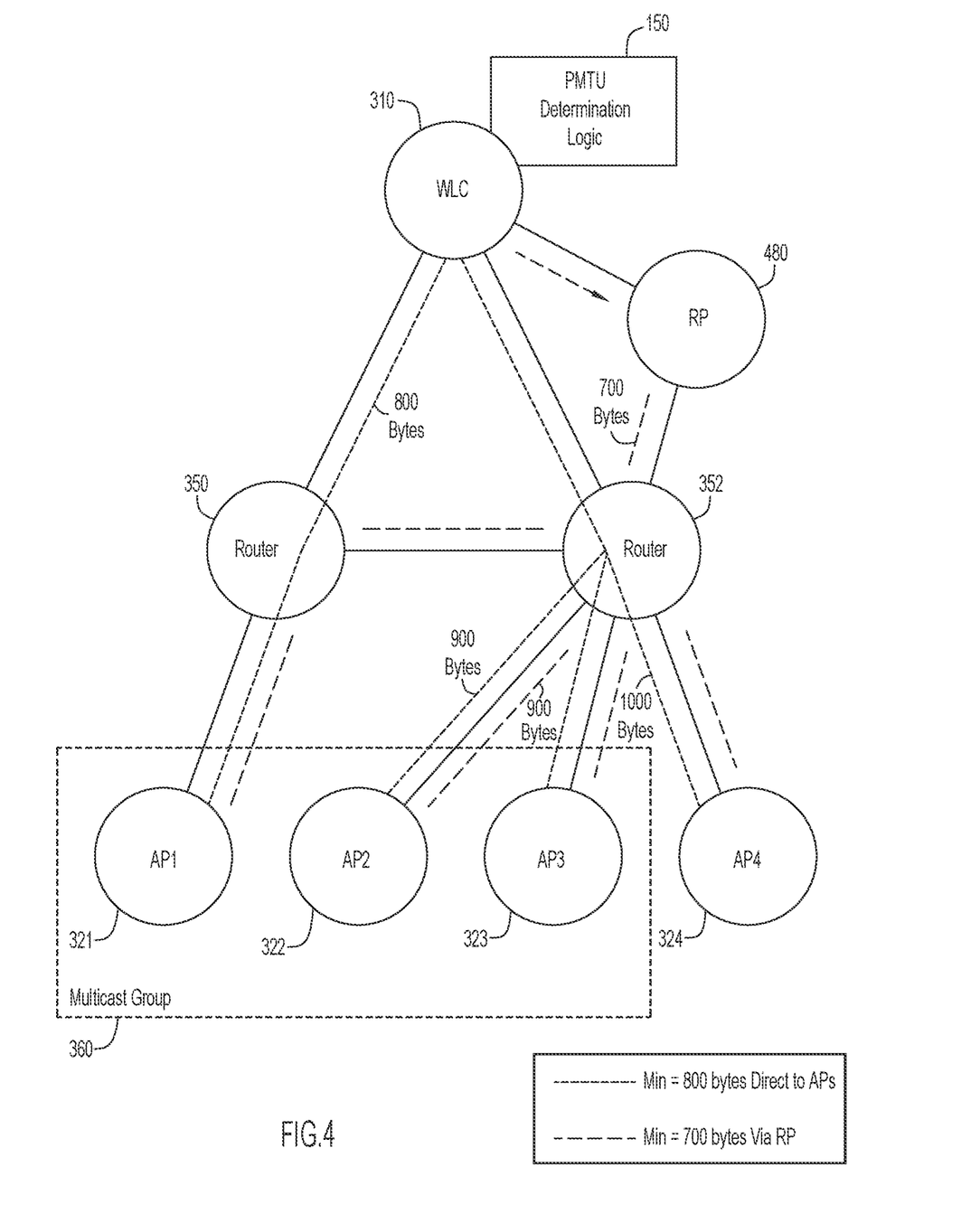
FIG. 4 is a block diagram of a network topology that is configured to run a type of multicast technology that is not well suited for the approach depicted in FIG. 2.

On the other hand, and as shown in FIG. 4, this approach may not be conducive to a multicast network running PIM Sparse Mode (PIM-SM), where a shared multicast tree is computed from a Rendezvous Point (RP) 480 to the destinations. In such a multicast network, the congruence of unicast and multicast paths is not guaranteed and therefore the inferred MTU can be wrong as depicted in FIG. 4, wherein the actual PMTU should be selected as 700 bytes (via RP 480), rather than 800 bytes according to the lowest PMTU directly to one of the APs, namely AP1 321.

Figure 5:
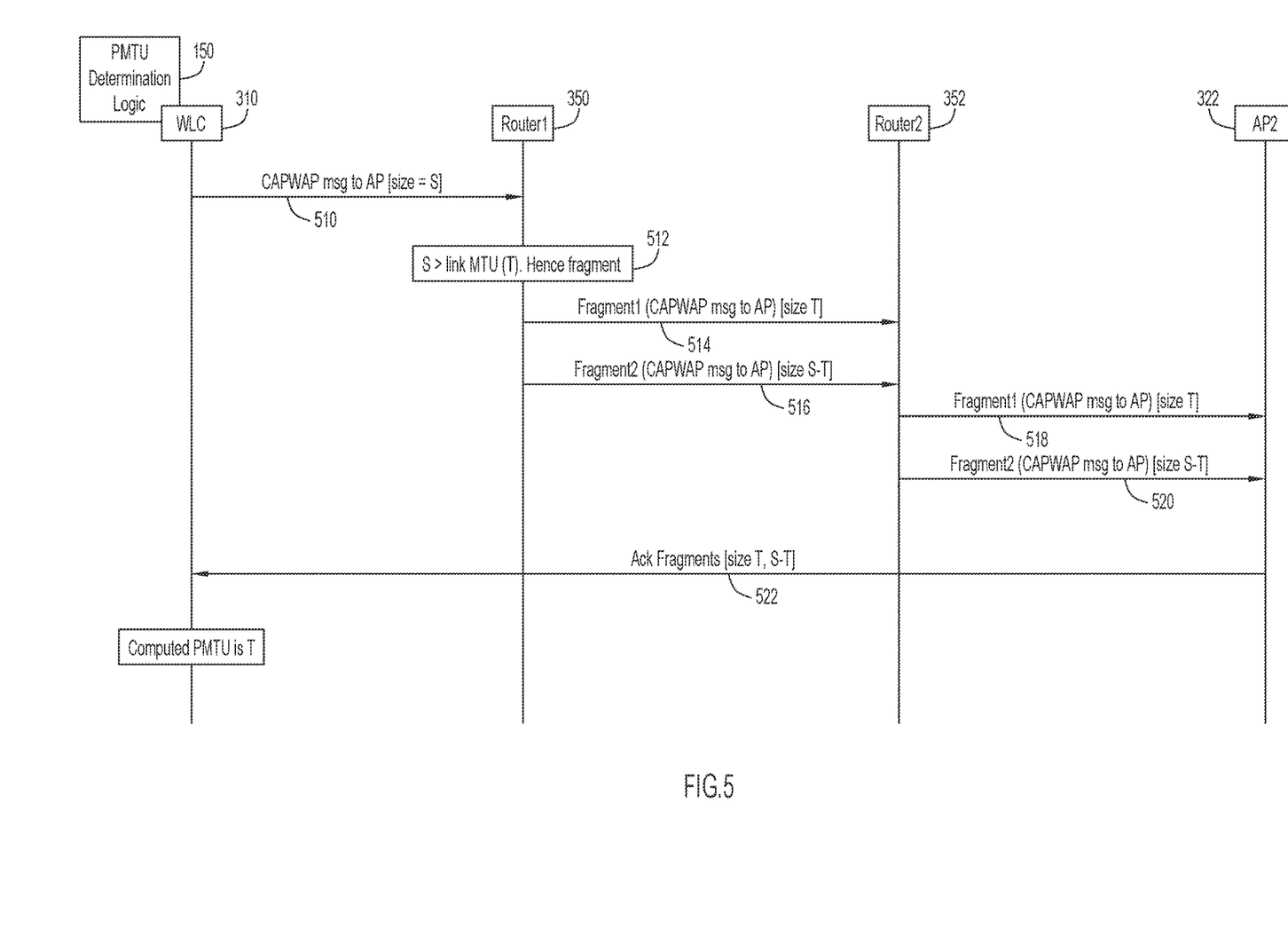
FIG. 5 is a sequence diagram depicting a method for determining a PMTU size in a network topology that is not subject to a "Don't Fragment" constraint, according to an example embodiment.

To alleviate the dependency on a specific multicast network deployment, specific Path MTU messages may be used that are targeted to the APs in multicast group 360 with a feedback loop using the unicast CAPWAP tunnels, as described below, Multicast Path MTU Messages without IP DF Bit Set FIG. 5 is a sequence diagram depicting a method for determining a PMTU size in a network topology that is not subject to a "Don't Fragment" constraint, according to an example embodiment. In this approach, PMTU determination logic 150 sends, or causes to be sent, messages for Path MTU Discovery from the WLC 310 without the constraint of setting the IP DF bit on CAPWAP packets. The packets are fragmented toward the destination as needed by the wired infrastructure. The fragments are collected by the APs and the size of the fragments is recorded as an indication of the minimum MTU experience over the path from wireless controller to AP. This size is communicated through the CAPWAP unicast tunnel and used by the PMTU determination logic 150 to compute the minimum MTU of APs participating in the CAPWAP multicast tunnel.

More specifically, at 510, PMTU determination logic 150 sends, or causes to be sent, a CAPWAP message to, e.g., AP 322 (and to other APs as well). At router 350, and at 512, it is determined that the size S of the message is greater than the MTU supported by the path to AP2 322. At 514, and 516, because the size S is too big, the message is fragmented into, in this case, two messages, one of size T, and one of size S-T. Those messages are passed to router 352, and forwarded to AP2 322 at 518, 520. At 522, the individual messages are acknowledged back to WLC 310 and PMTU determination logic 150, which compute the PMTU to AP2 322 as T, since a message at least as large as size T was evidently received at AP2 322.

WLC 310 in coordination with PMTU determination logic 150 may start with the same conservative assumption, and increase the MTU when confidence over the achievable MTU across the multicast tree is known. This ensures a backward compatible behavior and no traffic impact.

In this way, the PMTUD multicast process described above attempts different packet sizes in a similar way as the unicast PMTUD process.

Multicast Path MTU Messages with IP DF Bit Set

Figure 6:
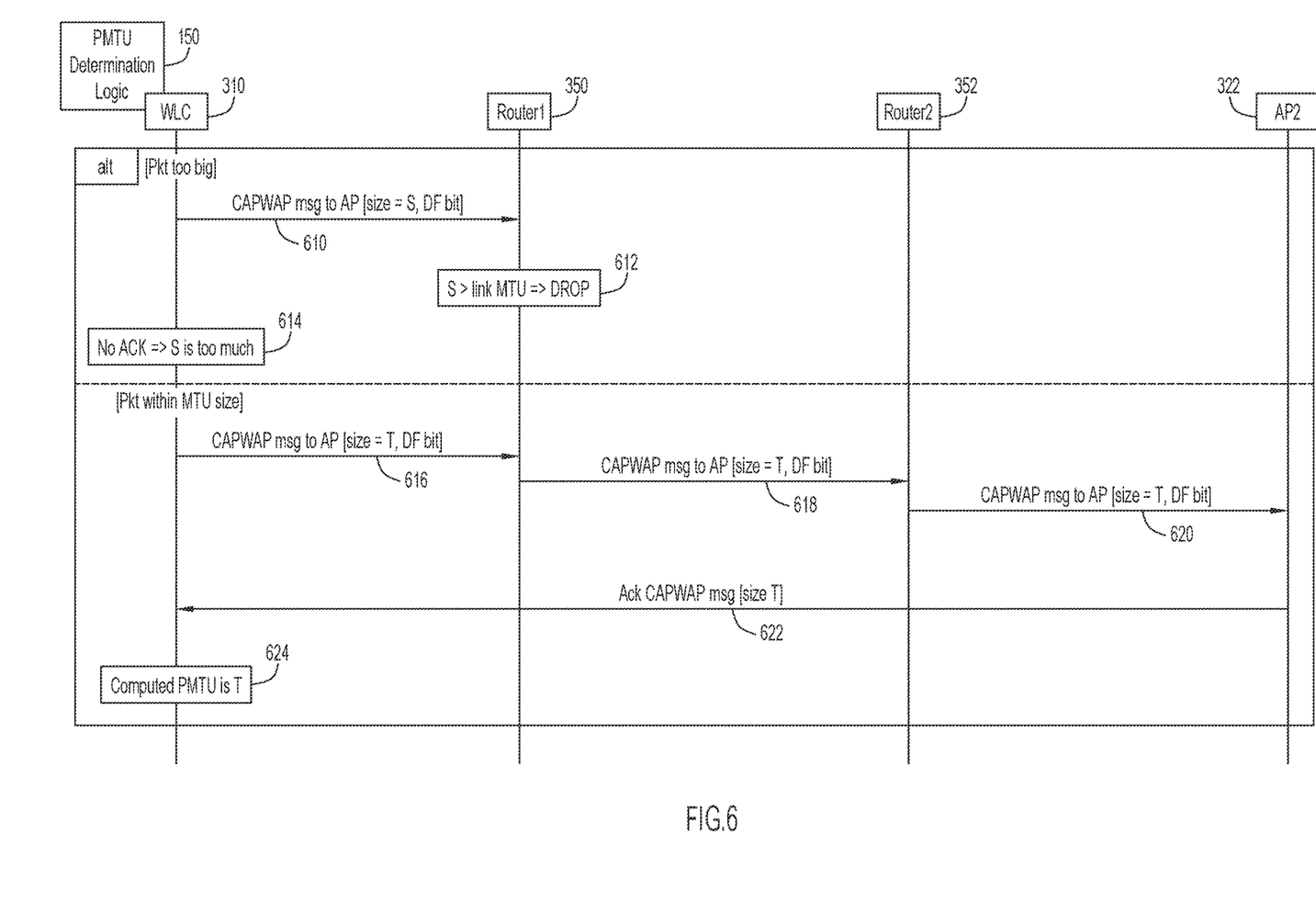
FIG. 6 is a sequence diagram depicting a method for determining a PMTU size in a network topology that is subject to a "Don't Fragment" constraint, according to an example embodiment.

FIG. 6 is a sequence diagram depicting a method for determining a PMTU size in a network topology that is subject to a "Don't Fragment" constraint, according to an example embodiment. In this approach, PMTU determination logic 150 sends, or causes to be sent, Path MTU Discovery messages from the WLC with the IP DF bit set. The maximum unicast Round Trip Time (RTT) between WLC 310 and a given AP is recorded and used to set a timeout on PMTUD CAPWAP multicast packets. A given size is attempted and upon reception, the AP acknowledges the reception of the multicast PMTUD to the controller.

More specifically, as shown near the top portion of FIG. 6, a sequence is depicted in which a CAPWAP packet having a size S, which is too big given the MTU between WLC 310 and router 350 is sent. At 610, PMTU determination logic 150 sends, or causes to be sent, a CAPWAP message, with the Don't Fragment" bit set, to, e.g., AP 322 (and to other APs as well). At 612, because the size of the packet is too big, the packet is dropped. At 614, no acknowledgement is received, inferring that the size S was too big for the MTU.

The bottom portion of FIG. 6 shows a sequence where the size T of the CAPWAP message is within the MTU limit. At 616, PMTU determination logic 150 sends, or causes to be sent, a CAPWAP message, with the Don't Fragment" bit set, to, e.g., AP 322 (and to other APs as well). At 618, router 350 forwards the message to router 352, and, at 620, router 352 forwards the message to AP2 322. Because the message was received by AP2 322, at 622, AP2 322 acknowledges receipt of the message. As such, at 624, PMTU determination logic 150 determines or computes the PMTU to AP2 322 as size T.

Software Defined Networking (SDN)-Based Approach

In another embodiment, and referring again to FIG. 3, some networks include a software defined network (SDN) controller 380 that is used to provision, manage and monitor the network 330. SDN controller 380 may be configured to compute the best multicast PMTU for all APs, by querying for the MTU for each segment of the network and monitoring the path of all the CAPWAP tunnels from WLC 310 to APs (AP1 321, AP2 322, etc.). SDN controller 380 may then communicate with PMTU determination logic 150 to set the MTU for a given multicast group. The MTU may be set according to the lowest computed PMTU among the segments. In one possible implementation, PMTU determination logic 150 may be combined with the functionality of SDN controller 380.

In one possible variation, SDN controller 380 can identify different paths for multicast traffic from WLC 310 to the APs. As such, SDN controller 380 may function effectively as a path computation element (PCE) that computes the best routes to maximize some particular function (PMTU, delay, etc.) and program network 330 in order to use that path (influencing PIM for example, or via programmable forwarding logic at all network nodes).

Thus, this SDN approach might include the operation of monitoring segments of a wireless local area network between a wireless local area network controller and a plurality of wireless access points to determine a maximum transmission unit size for respective segments of the wireless local area network, setting the maximum transmission unit size according to a path maximum transmission unit of one of the segments of the wireless local area network, and sending, from the wireless local area network controller, multicast packets to a multicast group comprising the plurality of wireless access points, wherein a size of the multicast packets is in accordance with the maximum transmit unit size. In one implementation, the monitoring is performed by a software define network controller.

Figure 7:
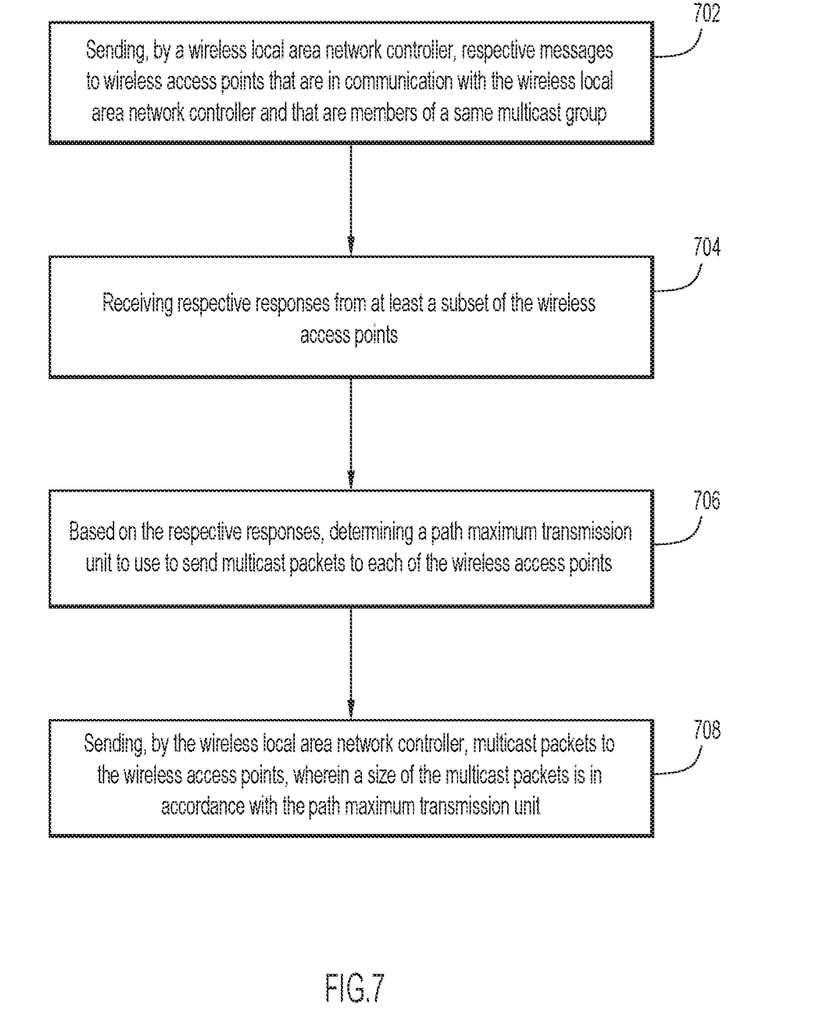
FIG. 7 is a flow chart depicting a series of operations for determining a PMTU size for a multicast packet that is transmitted in a WLAN, according to an example embodiment.

FIG. 7 is a flow chart depicting a series of operations for determining a PMTU size for a multicast packet that is transmitted in a WLAN, according to an example embodiment. In accordance with this embodiment, at 702, an operation is configured to send, by a wireless local area network controller, respective messages to wireless access points that are in communication with the wireless local area network controller and that are members of a same multicast group. At 704, an operation is configured to receive respective responses from at least a subset of the wireless access points. At 706, an operation is configured to, based on the respective responses, determine a path maximum transmit unit to use to send multicast packets to each of the wireless access points. And, at 708, an operation is configured to send, by the wireless local area network controller, multicast packets to the wireless access points, wherein a size of the multicast packets is in accordance with the path maximum transmit unit.

Figure 8:
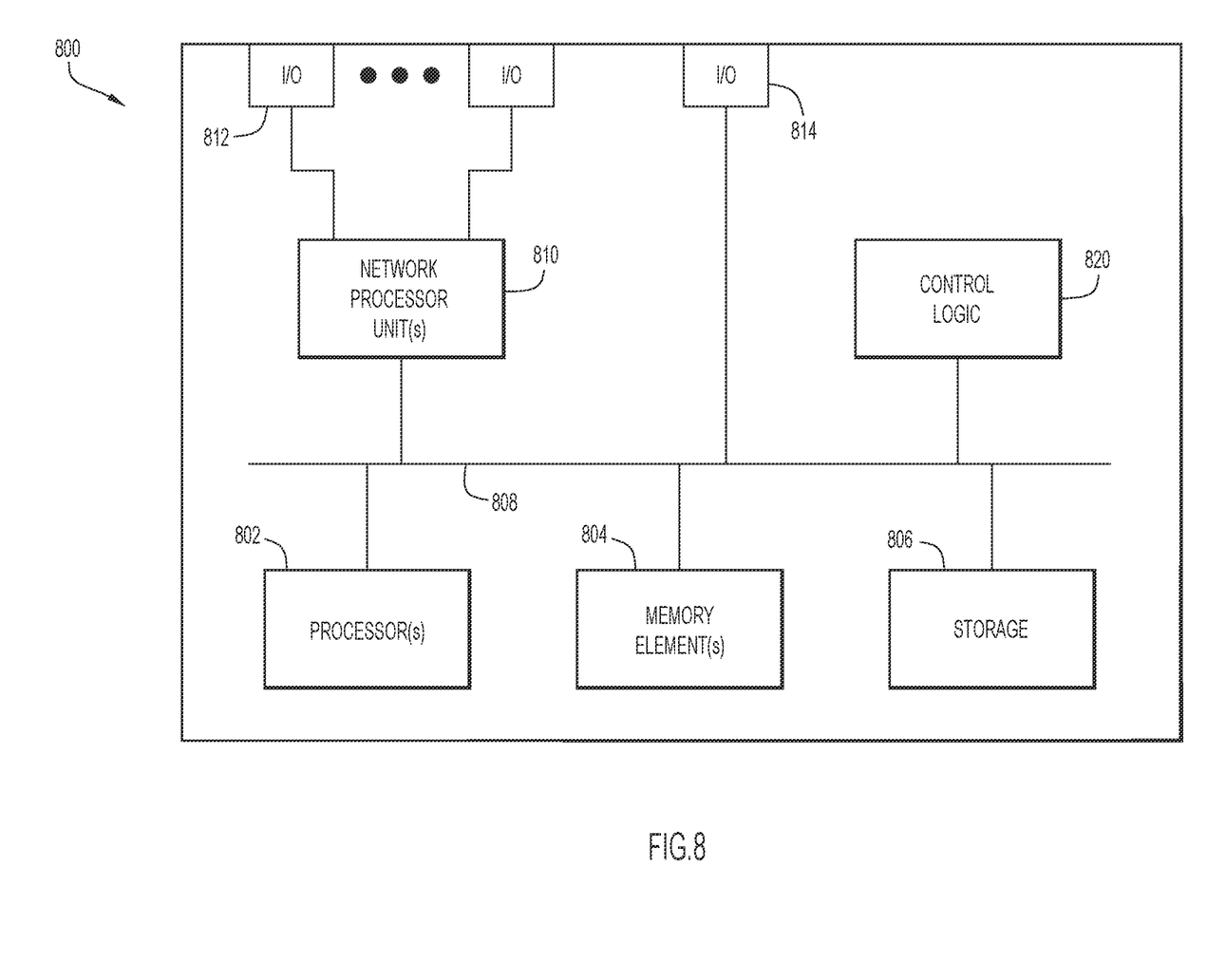
FIG. 8 is a block diagram of a device that may be configured to execute PMTU determination logic and perform the techniques described herein, according to an example embodiment.

FIG. 8 illustrates a hardware block diagram of a computing device 800 that may perform functions associated with operations discussed herein in connection with the techniques depicted in FIGS. 1-7. In various embodiments, a computing device, such as computing device 800 or any combination of computing devices 800, may be configured as any entity/entities as discussed for the techniques depicted in connection with FIGS. 1-7 in order to perform operations of the various techniques discussed herein.

In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820 (which could include, for example, PMTU determination logic 150). In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 706 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 700 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, in one embodiment a method is provided. The method may include detecting that an IPv4 multicast packet is to be transmitted from a wireless local area network controller to a plurality of wireless access points, embedding the IPv4 multicast packet in an IPv6 multicast packet, transmitting the IPv6 multicast packet to the wireless access points, extracting the IPv4 multicast packet from the IPv6 multicast packet, and transmitting the IPv4 multicast packet from the plurality of wireless access points.

In one implementation, the method includes embedding the IPv4 multicast packet in a Group ID field of the IPv6 multicast packet.

The method may further include setting a flag in a flag field of the IPv6 multicast packet, the flag being indicative that the IPv4 multicast packet is embedded in the IPv6 multicast packet.

In the method, the extracting may be performed at the plurality of access points. The extracting may also be performed at a node that is disposed between the wireless local area network controller and the plurality of wireless access points.

The method may further include the wireless local area network controller configuring the plurality of wireless access points via a control and provisioning of wireless access point (CAPWAP) protocol.

A device may also be provided. The device may include an interface configured to enable network communications, a memory, and one or more processors coupled to the interface and the memory, and configured to: detect that an IPv4 multicast packet is to be transmitted from a wireless local area network controller to a plurality of wireless access points, embed the IPv4 multicast packet in an IPv6 multicast packet, transmit the IPv6 multicast packet to the wireless access points, extract the IPv4 multicast packet from the IPv6 multicast packet and transmit the IPv4 multicast packet from the plurality of wireless access points.

The one or more processors may be further configured to embed the IPv4 multicast packet in a Group ID field of the IPv6 multicast packet.

The one or more processors may be further configured to set a flag in a flag field of the IPv6 multicast packet, the flag being indicative that the IPv4 multicast packet is embedded in the IPv6 multicast packet.

The one or more processors may be further configured to configure the plurality of wireless access points via a control and provisioning of wireless access point (CAPWAP) protocol.

Another method is provided, and may include sending, by a wireless local area network controller, respective messages to wireless access points that are in communication with the wireless local area network controller and that are members of a same multicast group, receiving respective responses from at least a subset of the wireless access points, based on the respective responses, determining a path maximum transmission (or transmit) unit to use to send multicast packets to each of the wireless access points, and sending, by the wireless local area network controller, multicast packets to the wireless access points, wherein a size of the multicast packets is in accordance with the path maximum transmit unit.

The method may further include sending the respective messages via unicast tunnels.

In the method, the unicast tunnels may be configured in accordance with a control and provisioning of wireless access point (CAPWAP) protocol.

In the method, the respective messages may be multicast path maximum transmit unit discovery messages.

In the method a Don't Fragment bit is set in the multicast path maximum transmit unit discovery messages. Alternatively, the Don't Fragment bit is not set in the multicast path maximum transmit unit discovery messages.

In the method the respective responses may include acknowledgement messages from the wireless access points.

Another device may similarly be provided. The device may include an interface configured to enable network communications, a memory, and one or more processors coupled to the interface and the memory, and configured to: send, by a wireless local area network controller, respective messages to wireless access points that are in communication with the wireless local area network controller and that are members of a same multicast group, receive respective responses from at least a subset of the wireless access points, based on the respective responses, determine a path maximum transmit unit to use to send multicast packets to each of the wireless access points, and send, by the wireless local area network controller, multicast packets to the wireless access points, wherein a size of the multicast packets is in accordance with the path maximum transmit unit.

The one or more processors may be further configured to send the respective messages via unicast tunnels.

The unicast tunnels may be configured in accordance with a control and provisioning of wireless access point (CAPWAP) protocol.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    detecting that an IPv4 multicast packet is to be transmitted from a wireless local area network controller to a plurality of wireless access points;
    setting a maximum transmission unit (MTU) size of the IPv4 multicast packet by embedding the IPv4 multicast packet in an IPv6 multicast packet including embedding a destination address of the IPv4 multicast packet in a Group ID field of an address of the IPv6 multicast packet;
    transmitting the IPv6 multicast packet to the plurality of wireless access points;
    extracting the IPv4 multicast packet from the IPv6 multicast packet; and
    transmitting the IPv4 multicast packet from the plurality of wireless access points as client data traffic.

2. The method of claim 1, wherein the maximum transmission unit (MTU) size of the IPv4 multicast packet is at least 1272 bytes.

3. The method of claim 1, further comprising setting a flag in a flag field of the IPv6 multicast packet, the flag being indicative that the destination address of the IPv4 multicast packet is embedded in the IPv6 multicast packet.

4. The method of claim 1, wherein the extracting is performed at the plurality of wireless access points.

5. The method of claim 1, wherein the extracting is performed at a node that is disposed between the wireless local area network controller and the plurality of wireless access points.

6. The method of claim 1, further comprising the wireless local area network controller configuring the plurality of wireless access points via a control and provisioning of wireless access point (CAPWAP) protocol.

7. A device comprising:
    an interface configured to enable network communications;
    a memory; and
    one or more processors coupled to the interface and the memory, and configured to:
        detect that an IPv4 multicast packet is to be transmitted to a plurality of wireless access points;
        set a maximum transmission unit (MTU) size of the IPv4 multicast packet by embed embedding the IPv4 multicast packet in an IPv6 multicast packet including embedding a destination address of the IPv4 multicast packet in a Group ID field of an address of the IPv6 multicast packet;
        transmit the IPv6 multicast packet to the plurality of wireless access points;
        extract the IPv4 multicast packet from the IPv6 multicast packet; and
        transmit the IPv4 multicast packet from the plurality of wireless access points as client data traffic.

8. The device of claim 7, wherein the maximum transmission unit (MTU) size of the IPv4 multicast packet is at least 1272 bytes.

9. The device of claim 7, wherein the one or more processors are further configured to set a flag in a flag field of the IPv6 multicast packet, the flag being indicative that the IPv4 multicast packet is embedded in the IPv6 multicast packet.

10. The device of claim 7, wherein the one or more processors are further configured to configure the plurality of wireless access points via a control and provisioning of wireless access point (CAPWAP) protocol.

11. A method comprising:
sending, by a wireless local area network controller, respective messages to wireless access points that are in communication with the wireless local area network controller and that are members of a same multicast group;
receiving respective acknowledgement responses, corresponding to the respective messages, including an indication of a size of received portions of the respective messages, from at least a subset of the wireless access points;
based on the respective acknowledgement responses, determining a path maximum transmission unit to use to send multicast packets to each of the wireless access points; and
sending, by the wireless local area network controller, multicast packets to the wireless access points, wherein a size of the multicast packets is in accordance with the path maximum transmission unit.

12. The method of claim 11, further comprising sending the respective messages via unicast tunnels.

13. The method of claim 12, wherein the unicast tunnels are configured in accordance with a control and provisioning of wireless access point (CAPWAP) protocol.

14. The method of claim 11, wherein the respective messages comprise multicast path maximum transmission unit discovery messages.

15. The method of claim 14, wherein a Don't Fragment bit is set in the multicast path maximum transmission unit discovery messages.

16. The method of claim 14, wherein a Don't Fragment bit is not set in the multicast path maximum transmission unit discovery messages.

17. The method of claim 11, wherein the respective acknowledgement responses comprise acknowledgement messages from the wireless access points.

18. A device comprising:
an interface configured to enable network communications;
a memory; and
one or more processors coupled to the interface and the memory, and configured to:
send respective messages to wireless access points that are in communication with the device and that are members of a same multicast group;
receive respective acknowledgement responses, corresponding to the respective messages, including an indication of a size of received portions of the respective messages, from at least a subset of the wireless access points;
based on the respective acknowledgement responses, determine a path maximum transmission unit to use to send multicast packets to each of the wireless access points; and
send multicast packets to the wireless access points, wherein a size of the multicast packets is in accordance with the path maximum transmission unit.

19. The device of claim 18, wherein the one or more processors are further configured to send the respective messages via unicast tunnels.

20. The device of claim 19, wherein the unicast tunnels are configured in accordance with a control and provisioning of wireless access point (CAPWAP) protocol.

* * * * *

UNITED STATES PATENT AND TRADEMARK OFFICE
CERTIFICATE OF CORRECTION

| | | |
|---|---|---|
| PATENT NO. | : 12,483,861 B2 | Page 1 of 1 |
| APPLICATION NO. | : 17/527572 | |
| DATED | : November 25, 2025 | |
| INVENTOR(S) | : Amine Choukir et al. | |

It is certified that error appears in the above-identified patent and that said Letters Patent is hereby corrected as shown below:

In the Claims

Claim 7, Column 14, Line 57, please replace "packet by embed embedding the IPv4" with --packet by embedding the IPv4--

Signed and Sealed this
Sixth Day of January, 2026

John A. Squires
*Director of the United States Patent and Trademark Office*